United States Patent [19]

Lasoen

[11] Patent Number: 4,619,153
[45] Date of Patent: Oct. 28, 1986

[54] VEHICLE TRANSMISSION

[75] Inventor: Jean J. Lasoen, Villepreux, France

[73] Assignee: Massey-Ferguson Services N.V., Curacao, Netherlands

[21] Appl. No.: 672,330

[22] PCT Filed: Mar. 8, 1984

[86] PCT No.: PCT/EP84/00067

§ 371 Date: Nov. 2, 1984

§ 102(e) Date: Nov. 2, 1984

[87] PCT Pub. No.: WO84/03668

PCT Pub. Date: Sep. 27, 1984

[30] Foreign Application Priority Data

Mar. 15, 1983 [GB] United Kingdom ............... 8307096

[51] Int. Cl.$^4$ .......................... G05G 5/10; G05G 9/12
[52] U.S. Cl. ...................... 74/477; 74/360; 74/745
[58] Field of Search ............ 74/473 R, 477, 360, 74/745

[56] References Cited

U.S. PATENT DOCUMENTS

| 2,052,042 | 8/1936 | Thompson | 74/473 R |
| 3,301,078 | 1/1967 | Michael | 74/477 X |
| 3,596,534 | 8/1971 | Logan | 74/473 R X |
| 3,899,934 | 8/1975 | Froumajou | 74/473 R X |
| 4,335,623 | 6/1982 | Kronstadt | 74/477 |
| 4,472,868 | 9/1984 | Takahashi | 74/477 X |

FOREIGN PATENT DOCUMENTS

| 58964 | 9/1981 | European Pat. Off. |
| 35223 | 9/1981 | European Pat. Off. |
| 806085 | 3/1951 | Fed. Rep. of Germany |
| 1101177 | 3/1961 | Fed. Rep. of Germany .... 74/473 R |
| 999854 | 10/1951 | France |
| 2089271 | 1/1972 | France |
| 611007 | 10/1960 | Italy .................................. 74/473 R |
| 319114 | 3/1957 | Switzerland |
| 713632 | 8/1954 | United Kingdom |
| 972777 | 10/1964 | United Kingdom |
| 1110388 | 4/1968 | United Kingdom |
| 1134220 | 11/1968 | United Kingdom |
| 1188598 | 4/1970 | United Kingdom |
| 2021214 | 11/1979 | United Kingdom |

OTHER PUBLICATIONS

Revue Technique, No. 101, Jan.-Feb., 1980, (Billancourt, France), "Les Nouvelles Boites de Vitesses ZF", Ecosplit, pp. 101–103.

Primary Examiner—Allan D. Herrmann
Attorney, Agent, or Firm—Robert L. Farris

[57] ABSTRACT

A vehicle transmission having a housing within which is disposed a multi-ratio main change speed gear set (X) and a first range change gear set (Z) in series and in which the speed and range changes are effected by selector forks (100, 101, 102) which are mounted on and axially movable relative to a single selector fork rail (105) which is held stationary (108) relative to the housing. Additionally selector forks (103, 104) for a second range gear set (Y) and a creeper gear facility (C) may be mounted on and movable relative to the same selector fork rail (105). The housing is also provided with an access aperture (132) and the selector fork rail (105) can be released and slid axially within the housing to allow removal of the selector forks (100, 101, 102, 103) one by one from one end of the rail (105) via the aperture (132).

7 Claims, 30 Drawing Figures

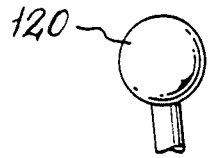
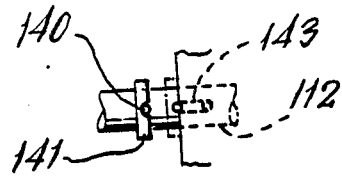
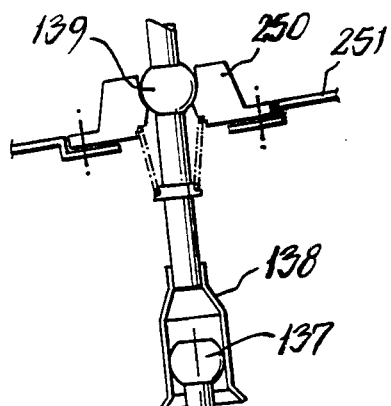
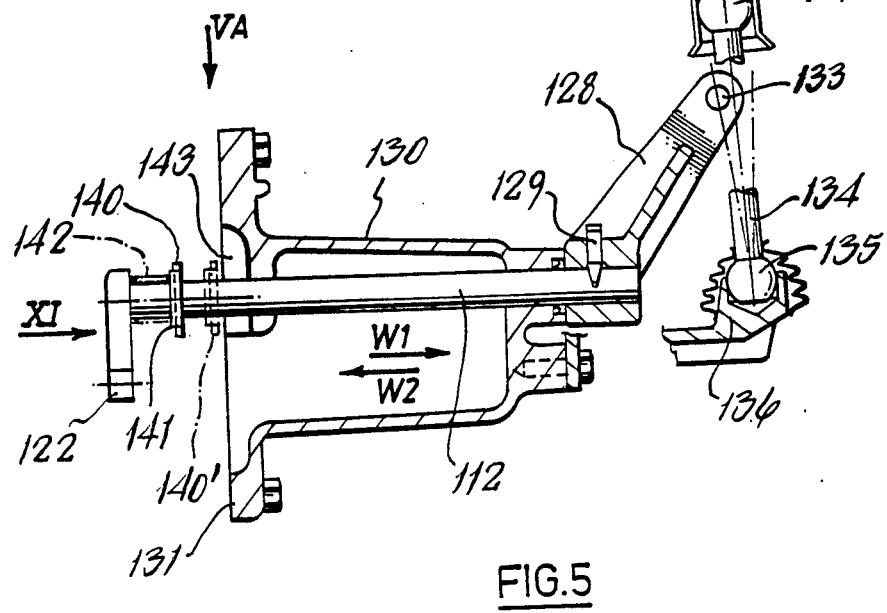
FIG.5A
FIG.5

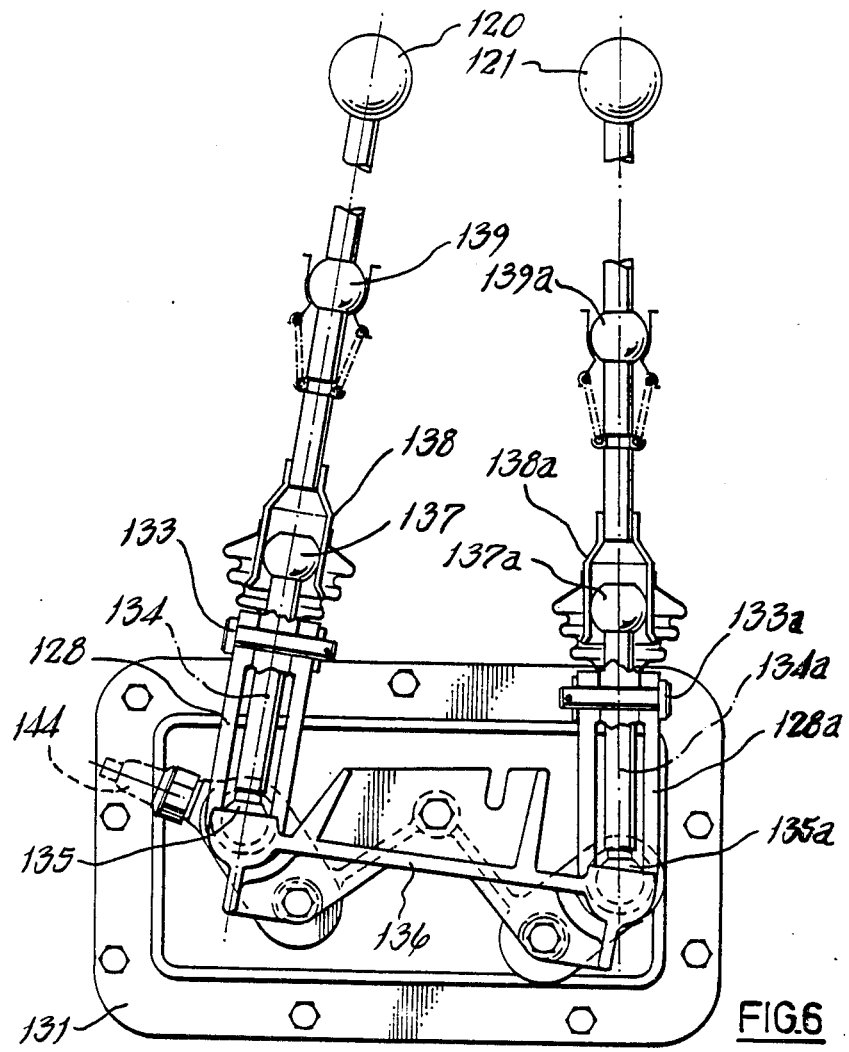

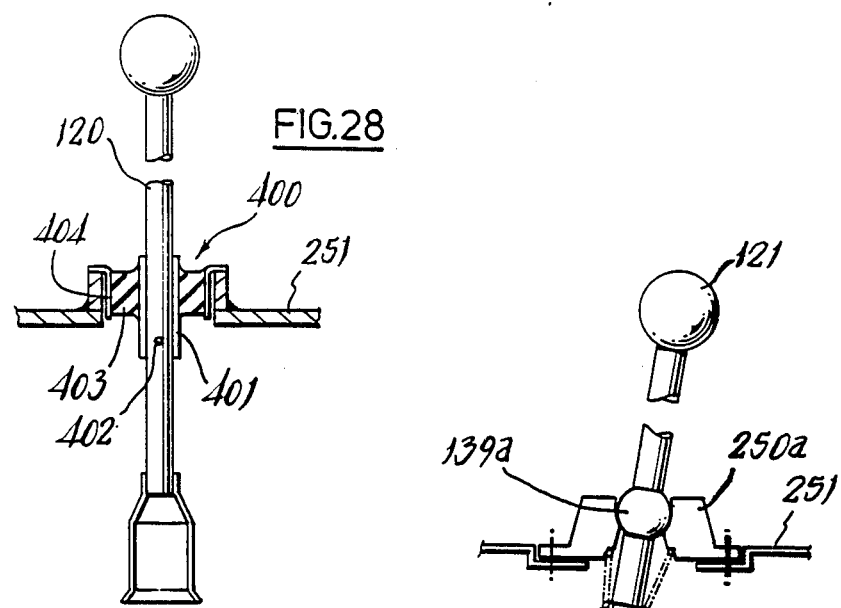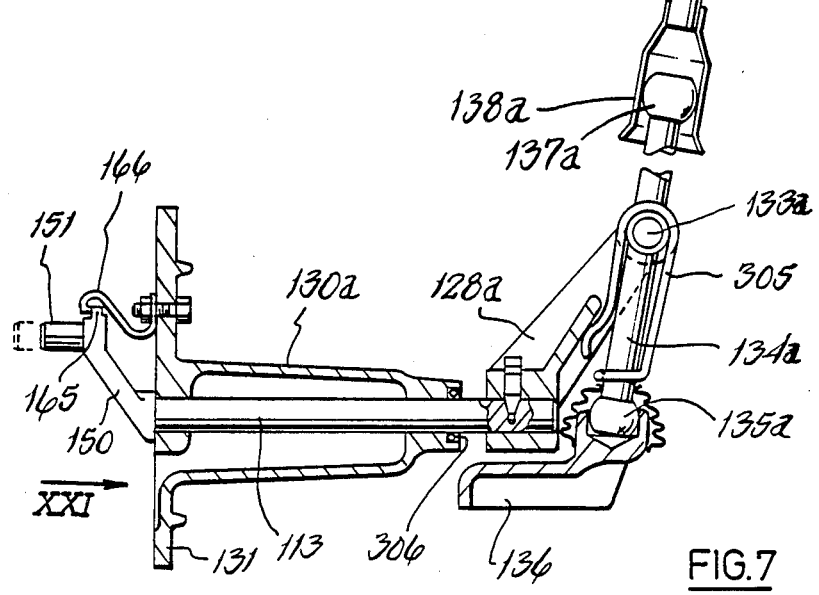

| FORWARD RANGE | FORWARD RATIO No. | INPUT TRAIN Z GEARS USED BY REFERENCE No | | MAIN TRAIN X GEARS USED BY REFERENCE No. | | | | OUTPUT TRAIN Y GEARS USED BY REFERENCE No. | |
|---|---|---|---|---|---|---|---|---|---|
| | | 29,32 | 28,31 | 10,15 | 11,16 | 12,17 | 13,18 | Q 25 | 13,18,.Q |
| F$_A$ | 1 | X | | X | | | | X | |
| | 2 | X | | | X | | | X | |
| | 3 | X | | | | X | | X | |
| | 4 | X | | | | | X | X | |
| F$_B$ | 5 | | X | X | | | | X | |
| | 6 | | X | | X | | | X | |
| | 7 | | X | | | X | | X | |
| | 8 | | X | | | | X | X | |
| F$_C$ | 9 | X | | X | | | | | X |
| | 10 | X | | | X | | | | X |
| | 11 | X | | | | X | | | X |
| | 12 | X | | | | | X | | X |
| F$_D$ | 13 | | X | X | | | | | X |
| | 14 | | X | | X | | | | X |
| | 15 | | X | | | X | | | X |
| | 16 | | X | | | | X | | X |

FIG. 24

| REVERSE RANGE | REVERSE RATIO No. | INPUT TRAIN Z GEARS USED BY REFERENCE No. | | MAIN TRAIN X GEARS USED BY REFERENCE No. | | | | OUTPUT TRAIN Y GEARS USED BY REFERENCE No. | |
|---|---|---|---|---|---|---|---|---|---|
| | | 28 34 33 32 | 29,32,33, 34,28,31 | 10,15 | 11,16 | 12,17 | 13,18 | Q,25 | 13,18, Q |
| RA | 1 | X | | X | | | | X | |
| RA | 2 | X | | | X | | | X | |
| RA | 3 | X | | | | X | | X | |
| RA | 4 | X | | | | | X | X | |
| RB | 5 | | X | X | | | | X | |
| RB | 6 | | X | | X | | | X | |
| RB | 7 | | X | | | X | | X | |
| RB | 8 | | X | | | | X | X | |
| RC | 9 | X | | X | | | | | X |
| RC | 10 | X | | | X | | | | X |
| RC | 11 | X | | | | X | | | X |
| RC | 12 | X | | | | | X | | X |
| RD | 13 | | X | X | | | | | X |
| RD | 14 | | X | | X | | | | X |
| RD | 15 | | X | | | X | | | X |
| RD | 16 | | X | | | | X | | X |

VEHICLE TRANSMISSION

TECHNICAL FIELD

This invention relates to vehicle transmissions and in particular to selector fork arrangements used to select the operative ratio of such transmissions.

There is a longstanding requirement for a simple and easily accessible selector fork arrangement suitable for the type of transmission which is used in agricultural and industrial tractors (or similar vehicles) and which has a multi-ratio main change speed gear set and a range change gear set in series.

DISCLOSURE OF THE INVENTION

It is an object of the present invention to provide a vehicle transmission of the above described type which has an improved selector fork arrangement.

Thus according to the present invention there is provided a vehicle transmission having a housing within which is disposed a multi-ratio main change speed gear set and a first range change gear set in series and in which the speed and range changes are effected by selector forks which are mounted on and axially movable relative to a single selector fork rail which is held stationary relative to the housing.

The transmission may have a second range change gear set operated by a further selector fork which is also mounted on and movable relative to the same selector fork rail.

Additionally the transmission may include a creeper gear facility which is operated by a still further selector fork which is also mounted on and movable relative to the same selector fork rail.

Preferably the housing is provided with an access aperture and said selector fork rail is releasably mounted in the housing in a manner which permits the rail to be axially slid within the housing after the release of rail fastening means to allow removal of the selector forks one by one from one end of the rail via said aperture. Such an arrangement enables the selector forks to be easily accessible and removable from the housing.

One of the range change selector forks may be moved axially relative to the rail by an hydraulic cylinder which surrounds the rail.

Preferably the hydraulic cylinder is double-acting and contains a differential area double-acting piston which surrounds the rail and divides the cylinder into two operating chambers, the arrangement being such that if both operating chambers are subjected to the same level of pressure the piston moves in a first direction and if only one chamber is pressurised the piston moves in the opposite direction.

The invention also provides a vehicle transmission having a housing within which is disposed a multi-ratio change speed gear set in which the speed changes are effected by selector forks which are mounted on and axially movable relative to a single selector fork rail which is held stationary relative to the housing, the housing being provided with an access aperture and the selector fork rail being releasably mounted in the housing in a manner which permits the rail to be axially slid within the housing after the release of the rail fastening means to allow removal of the selector forks one by one from one end of the rail via said aperture.

The invention also provides a selector fork arrangement for a vehicle transmission contained within a housing, the arrangement comprising a selector rail, selector rail fastening means for holding the rail stationary relative to the tansmission housing, and a plurality of selector forks axially movable relative to the rail to effect changes in the operative ratio of the transmission.

DESCRIPTION OF THE DRAWINGS

One embodiment of the present invention will now be described by way of example only, with reference to the accompanying drawings in which:

FIG. 5A is a scrap plan view in the direction of Arrow VA of FIG. 5;

FIGS. 5, 6 and 7 are views of the gear lever selector mechanism in the directions of Arrows V, VI and VII of FIG. 3 respectively;

FIGS. 24 and 25 show in tabular form the gear wheels used to engage the forward and reverse ranges of the transmission;

FIG. 28 shows in section an alternative form of gear lever mount.

Figure 1:
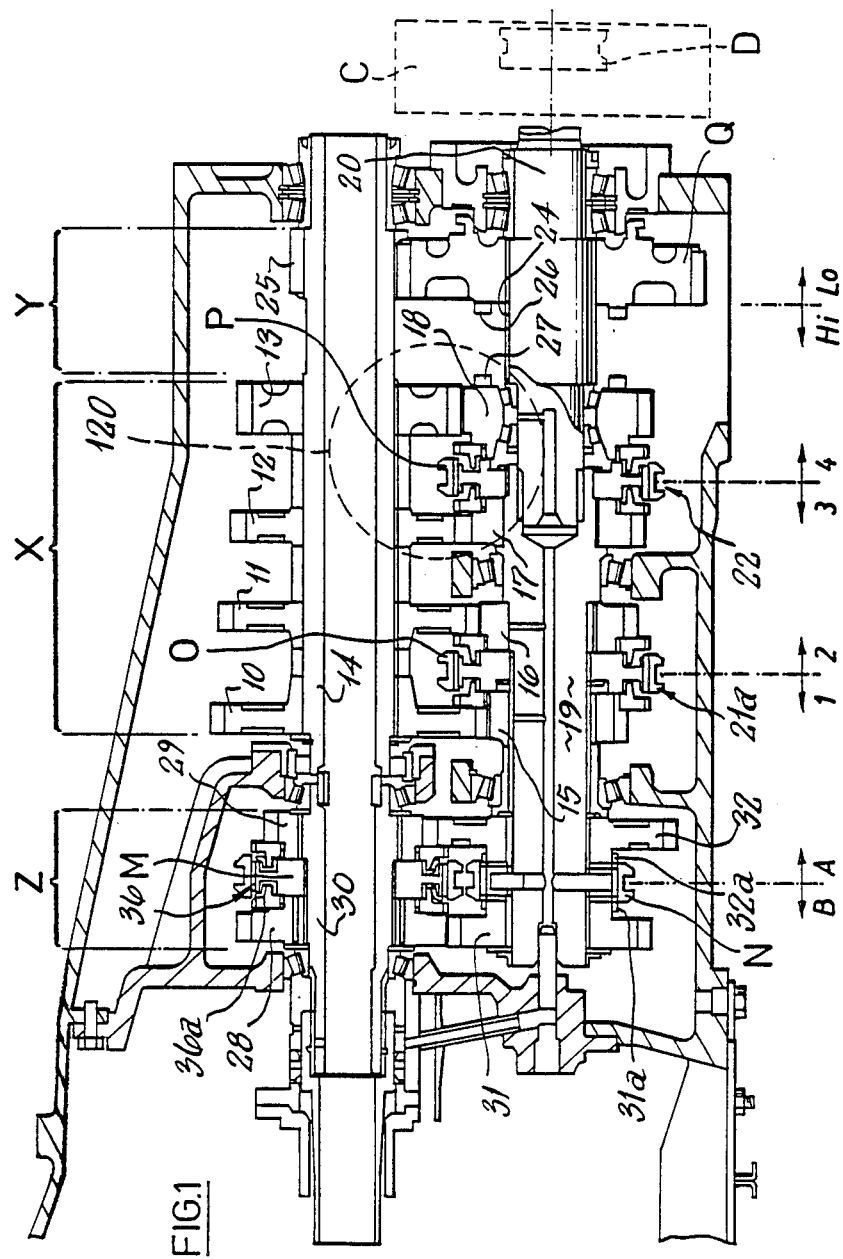
FIG. 1 is a side view of a tractor transmission which is controlled by the selector mechanism of the present invention.

The transmission (shown in FIG. 1) comprises a main four-speed change speed gear set X, a two-speed High/Low output gear set Y, and a constant mesh input gear set Z capable of providing two forward ratios and two reverse ratios.

BEST MODE OF CARRYING OUT INVENTION

The main change speed set X comprises four gears 10, 11, 12 and 13 which are splined onto a lay shaft 14 and four constant mesh gears 15, 16, 17 and 18 which are rotatably mounted on the two portions 19 and 20 of the transmission output shaft.

Gears 15 and 16 are associated with synchromesh unit 21 which has a slidable sleeve O and which provides first and second ratios by sliding sleeve O to the left and right respectively while gears 17 and 18 are associated with synchromesh unit 22 which has a slidable sleeve P and which provides third and fourth ratios by sliding P to the left and right respectively.

The output gear set Y comprises a gear Q slidable on splines 24 provided with a gear 25 which rotates with the lay shaft 14 to provide a low output train ratio. By sliding the gear Q on the splines 24, teeth 26 on the gear Q can be meshed with co-operating teeth 27 on the gear 18 thus locking the gear 18 to the shaft portion 20 and providing a higher output train ratio via gears 13 and 18.

Figure 2:
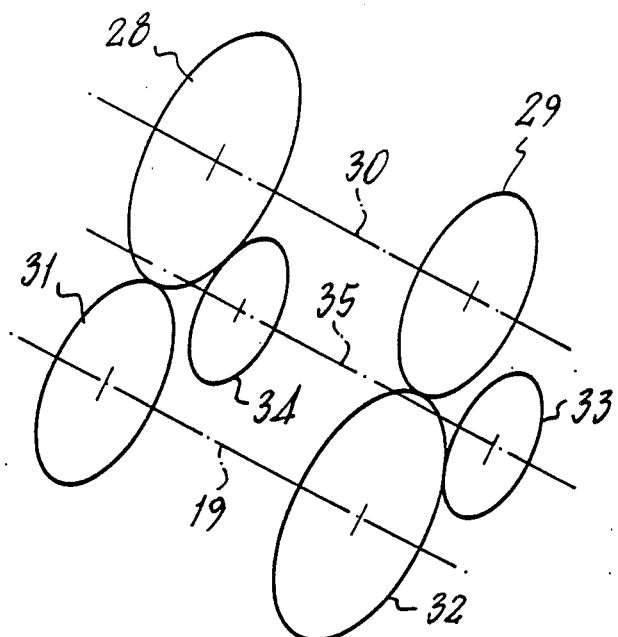
FIG. 2 diagrammatically shows the gear wheel layout of the input gear Z of the transmission.

The input gear set Z comprises gears 28 and 29 which are rotatably mounted on an input shaft 30. These two gears are in constant mesh with gears 31 and 32 which are in turn rotatably mounted on the output shaft portion 19. Mounted behind the gears 28, 29, 21 and 32 as viewed in FIG. 1, are two idler gears 33 and 34 shown diagrammatically in FIG. 2 which mesh with gears 32 and 28 respectively. The idler gears rotate with a common shaft 35.

Associated with the gears 28 and 29 is a syncromesh unit whose sleeve M can be used to couple either the gear 28 or the gear 29 to the input shaft 30. A simple sliding collar N is used for coupling either the gear 31 or 32 to the output shaft 19 although a further synchromesh unit could be used if desired.

The input gear set Z can be arranged to provide a high forward ratio by moving the sleeve to the left to couple the gear 28 to the input shaft 30 and also sliding the collar N to the left to contact the gear 31 with the shaft portion 19. A low forward ratio can be provided by engaging the sleeve with the gear 29 and sliding the collar N to the right to couple the gear 32 with the shaft portion 19.

A first reverse ratio is obtained from the input shaft Z when the sleeve M couples the gear 28 to the input shaft 30 and the collar N couples the gear 32 to the shaft portion 19. With the synchronising sleeve and the collar in these positions drive passes from the input shaft 30 via gear 28, gear 34, shaft 35, gear 33 and gear 32 to the shaft portion 19. A further reverse ratio is obtained by engaging the synchronising sleeve M with the gear 29 and moving the collar N to couple the gear 31 with the shaft portion 19. In this condition drive is transmitted from the input shaft 30 via gear 29, gear 32, gear 33, shaft 35, gear 34, gear 28 and gear 31 to the shaft portion 19.

Thus the input set Z, is capable of providing two forward ratios and two reverse ratios which enable the whole transmission to provide, if required, sixteen forward ratios and sixteen reverse ratios.

The sixteen forward ratios of the transmission are split into four ranges FA, FB, FC and FD with each of the four ratios of the main change speed set X being engageable in each range.

Range FA is engaged when the drive through the input train Z is via gears 29 and 32 and the drive through output train Y is via gears Q and 25.

Range FB is engaged when the drive through input train Z is via gears 28 and 31 and the drive through output train Y is via gears Q and 25.

Range FC is engaged when the drive through input train Z is via gears 29 and 32 and the drive through output train Y is via gears 13, 18 and Q.

Range FC is engaged when the drive through input train Z is vias gears 28 and 31 and the drive through output train Y is via gears 13, 18 and Q.

The gear wheels used to engage each of the sixteen forward ratios are summarised in tabular form in FIG. 24.

In a similar fashion the sixteen reverse ratios of the transmission are split into four ranges RA, RB, RC and RD.

The gear wheels used to engage each of the sixteen reverse ratios are summarised in tabular form in FIG. 25.

As will be appreciated from the above, the operative forward of reverse range of the transmission is determined by the drive path which is selected in gear trains Z and Y.

If desired a two-speed planetary creeper unit C can be installed at the output end of shaft 20 as shown diagrammatically by dotted detail C in FIG. 1. This creeper unit doubles the number of ratios which the transmission can provide an may, for example, have an axially slidable mechanical coupling sleeve D, which changes the operative creeper ratio.

Figure 3:
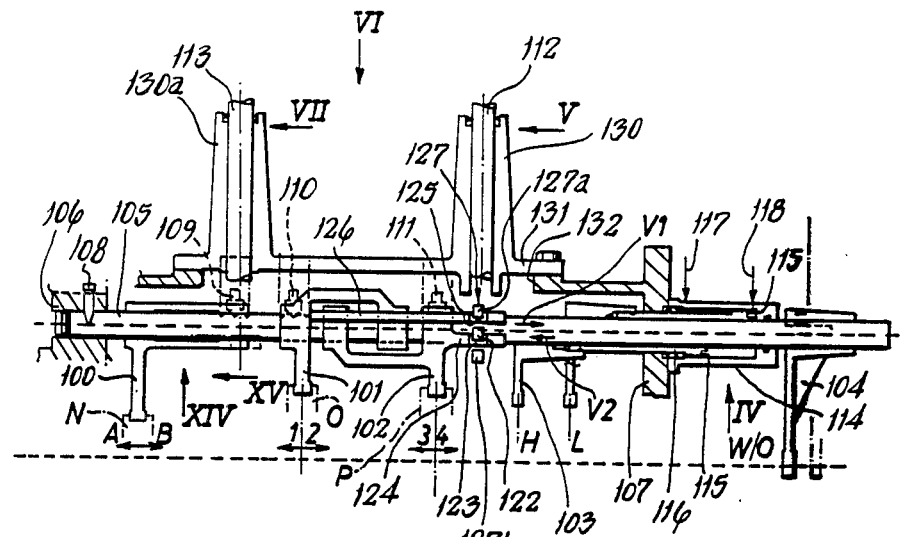
FIG. 3 is a plan view of the selector fork layout of the transmission.

Sleeves N,O,P Gear Q and Sleeve D are axially displaced by selector forks 100,101, 102, 103 and 104 respectively shown in FIG. 3 which are mounted on a single fixed selector fork rail 105 which is supported at 106 and 107 and held stationary in the transmission housing.

The selector forks and rail 105 are located behind the gears 31, 32, 15, 16, 17, 18 and Q as viewed in FIG. 1 as can be seen from FIG. 3 which is a plane view.

Rail 105 is held fast in the transmission casing by a set screw 108 and the position of selector forks 100, 101 and 102 relative to the rail is maintained by detent devices 109, 110 and 111 respectively.

The axial position of forks 101 and 102 on rail 105 is controlled using selector shaft 112 as will be explained below. A further selector shaft 113 controls the axial position of fork 100 on rail 105 and also the position of the forward and reverse selecting sleeve M of input gear set Z.

Figure 4:
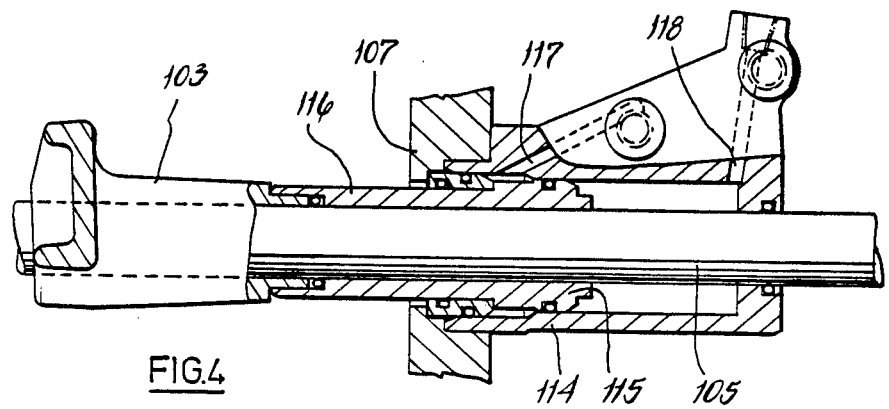
FIG. 4 is an enlarged side view in the direction of Arrow IV of FIG. 3 of the hydraulic High/Low range actuating cylinder.

The axial position of selector fork 103 is controlled by an hydraulic cylinder 114 (FIGS. 3 and 4) which surrounds rail 105. Cylinder 114 contains a differential area double-acting piston 115 which is supported adjacent one end of a sleeve 116 which in turn surrounds rail 105 and is connected with selector fork 103. Piston 115 is shown above rail 105 in FIG. 3 in its extreme right-hand (low range) position and below rail 105 in its extreme left-hand (high range) position.

Both ends of cylinder 114 are provided with hydraulic fluid inlets 117 and 118 respectively. The piston 115 and sleeve 116 are moved to the left-hand position by connecting both inlets 117 and 118 with hydraulic fluid at the same pressure level. Movement of piston 115 and sleeve 116 to the left occurs by virtue of the differential area of piston 115 which, as can be seen from FIG. 4, has a larger cross-sectional area exposed to the fluid pressure supplied via inlet 118 than via inlet 117. To move piston 115 and sleeve 116 to the right, inlet 118 is disconnected from the pressure supply and vented so that the pressure supplied via inlet 117 moves the piston and sleeve to the right.

This simple hydraulic piston and cylinder arrangement has the virtue that the hydraulic circuit which supplies inlets 117 and 118 is only required to supply one level of pressure and movement of the piston 115 can be effected by either simply connecting or disconnecting inlet 118 from the pressure source using, for example, a solenoid operated valve which also vents inlet 118 when disconnecting from the pressure source.

The selector fork 104 which controls the operation of creeper unit C can be operated either mechanical using a separate selector lever and mechanical linkage or electro hydraulically using a solenoid-operated hydraulic valve (operated from a push button) which controls a hydraulic piston and cylinder unit connected with the selector fork.

The selector forks 100, 101, 102 and 103 can be removed from the transmission housing via access opening 132 after the removal of plate 131 by undoing set screw 108 and then sliding rail 105 to the right as viewed in FIG. 3 and removing of plate 131 by undoing set screw 108 and then 105 and out through opening 132 as the rail is slid to the right. The backaxle housing which is secured to the rear of the transmission housing is dimensioned to allow the rail 105 to be slid to the right as described above.

As indicated above, sleeves O and P are controlled using selector shaft 112, and sleeves M and N are controlled using selector shaft 113. Selector shafts 112 and 113 are in turn moved by gear levers 120 and 121 respectively. Since the connection between the gear lever 120 and its associated selector shaft 112 is the same as the connection between gear lever 121 and its associated selector shaft 113, only the connection of lever 120 with shaft 112 will be described in detail. Corresponding components in the connection of gear lever 121 with shaft 113 will be denoted by the same reference numerals with the suffix 'a' added.

As can be seen from FIG. 5, the inner end of selector shaft 112 carries a finger 122 which is engageable either in a cut-out 123 formed in a web 124, (FIG. 3) connected with selector folk 102 or in a cut out 125 formed in a web 126 which is connected with selector fork 101.

Figure 8:
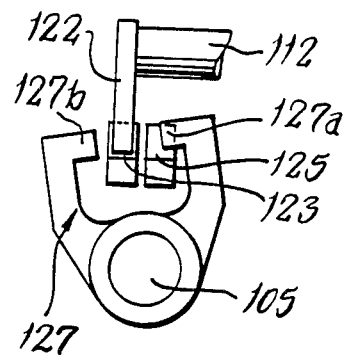
FIGS. 8 and 9 show the operation of the interlock used in the main gear set X.

Also associated with the finger 122 is a generally C-shaped interlock member 127, which is pivotly mounted on shift rail 105 and is best seen in FIG. 8. With the finger 122 in the position shown in FIGS. 3 and 8, turning of the selector shaft 122 about its longitudinal axis will result in displacement of the end of finger 122 which engages cutout 123 in the direction of arrow V1 or V2 of FIG. 3, depending on the direction of turning of shaft 112. This in turn causes a corresponding axial shifting of selector fork 102 with a corresponding change in the operative ratio of the main change speed set X.

It will be understood that with the finger 122 engaged in cut-out 123, end 127a of interlock member 127 engages in cut-out 125, thus preventing any axial movement of the selector fork 101.

Figure 9:
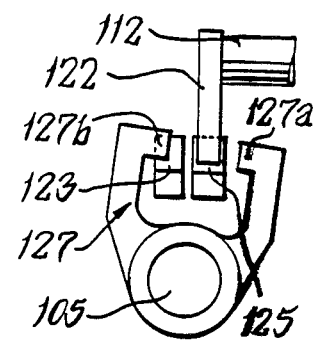

Finger 122 is engaged in cut-out 125 to operate selector fork 101 by axially shifting the selector shaft 112 in the direction W1 of FIG. 5. This movement of Finger 122 causes the finger to contact end 127a of interlock member 127 thus pivoting the interlock member about rail 105 to bring end 127b into cut-out 123, as shown in FIG. 9, thus preventing movement of selector fork 102. With finger 122 engaged in cut-out 125, selector fork 101 can be moved to again changed the operative ratio of the main change of speed set X.

It will be appreciated from the above that the four operative ratios of the main change speed set X are obtained by movements V1 and V2 of selector finger 122 when engaged in cut-out 123 or 125, and that the selector finger is moved between the cut-outs 123 and 125 as a result of axial displacement of the selector shaft 112 in directions W1 and W2.

Displacements V1, V2, W1 and W2 of finger 122 are achieved as follows:

The outer end of selector shaft 112 carries a fork member 128 which is secured to shaft 112 by a set screw 129. Shaft 112 is supported by a surrounding extension 130 which is formed as an integral part of a plate 131, which closes an access opening 132 in the side of the transmission housing. Fork member 128 is connected via a pin 133 with a lower lever member 134, whose lower end is pivotly mounted by a ball mount 135 in a support bracket 136 which is bolted to plate 131. The upper end of lever 134 is provided with a part spherical member 137 which is received in a cup member 138 provided on the lower end of gear lever 120. Gear lever 120 is pivoted intermediate its ends on a part-spherical ball 139 which supported via a part-spherical cup-like mount 250 which is secured to the floor 251 of a tractor cab or operators platform. As is conventional practice the cab or platform is itself also vibrationally isolated from the tractor chassis which includes the transmission housing.

FIG. 28 shows an alternative form of mount for levers 120 and 121 in which the ball 139 and mount 250 are replaced by the vibration isolating mount 400 having a central metal tube 491 through which lever 120 extends and is pinned to the lever at 402. The tube 401 is surrounded by an annulus of polymeric material 403 which is bonded to the tube 401 and also to an outer metal ring 404 which is then secured to the cab floor 251. The necessary pivotal articulation of lever 120 is accommodated by flexing of the polymeric annulus 403.

The ratio selector mechanism described above in which gear lever 120 is mounted above the lower lever 134 which in turn moves a selector shaft 112 is the subject of the Applicant's co-pending U.S. patent application Ser. No. 672,329 (which claims priority from UK Patent Application No. 8307097).

Figure 12:
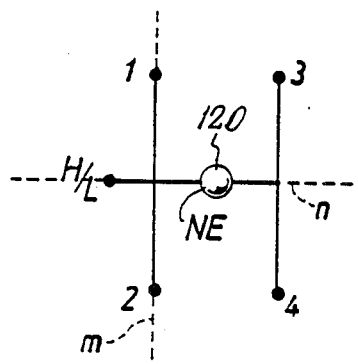
FIG. 12 and 13 show the operating gates for gear levers 120 and 121 respectively.
Figure 10:
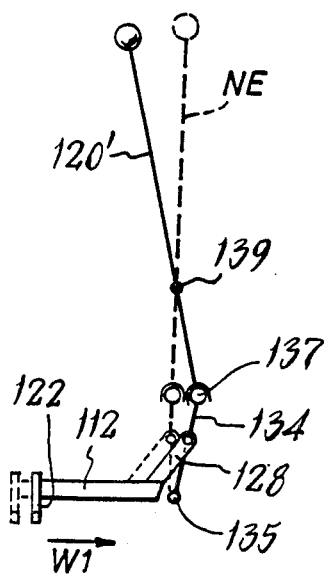
FIGS. 10 and 11 diagrammatically illustrate the movement of gear lever 120 (FIG. 10 being a corresponding view to FIG. 5 and FIG. 11 being in the direction of Arrow XI of FIG. 5)
Figure 11:
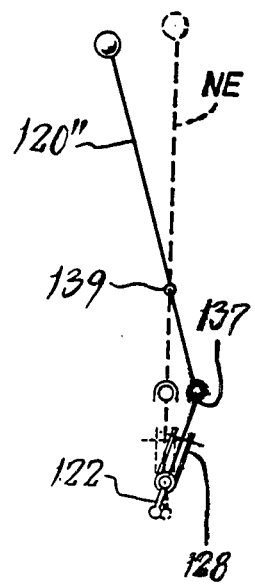

FIG. 12 shows the gate pattern for the movement of gear lever 120 while FIGS. 10 and 11 diagramatically shown the various movements of the gear lever 120 and the corresponding movements of the selector finger 122.

If we assume that the operator wishes to select the first ratio he moves the lever 120 to the left from its neutral position NE shown in FIG. 12 and then forwardly. These two movements are indicated by positions 120' and 120" in FIGS. 10 and 11 respectively. As can be seen from FIG. 10 sideways movement of the lever 120 to the position 120' results in the pivoting to the left of the lower lever 134 with consequence axial sliding of selector shaft 112 in direction W1 to bring finger 122 into the cut-out 125 associated with selector fork 101. Subsequent forward movement of the lever 120 to the position 120" showed in FIG. 11 turns selector shaft 112 in order to displace the selector fork 101 in direction V2 in order to select the first ratio.

As will be appreciated from the above description, all four ratios of the name change speed set X can be selected using the combination of sideways and forward-/rearward movement of lever 120.

As can be seen from FIG. 12, an additional position designated H/L for the selection of the High/Low range of gear set Y is provided to the left of the first and second ratio positions of the gear lever gate.

As can be seen from FIG. 5, selector shaft 112 is provided with a cross pin 140 against which bears a ring 141 which is spring biased by a coil spring 142 away from selector finger 122. When the gear lever 120 is moving in the first and second ratio plane indicated as 'm' in FIG. 12 (towards which the selector mechanism is biassed by spring means not shown), the cross pin 140 is at location 140' in FIG. 5 (i.e., just to the left of the inside of cover 131). If the lever 120 is in the neutral plane indicated at 'n' in FIG. 12, the cross pin 140 is able to enter a slot 143 provided in the cover 131, thus allowing the selector shaft 112 to move further to the right in the direction W1. This further movement to the right is arranged to operate an electrical switch 144 shown in FIG. 6 which changes the state of the solenoid valve which controls the connection and disconnection of inlet 118 with the hydraulic pressure supply. Thus, for example, a movement of lever 120 to the left past the plane 'm' will select the High range of gear set Y, and the next movement of the lever to the left past the plane 'm' will select the lower range of gear set Y, etc. This is a simple and efficient manner to incorporate yet another function under the control lever 120.

Figure 13:
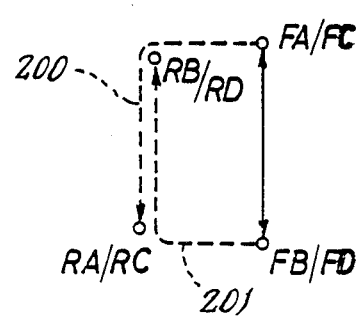

FIG. 13 shows the gate for gear lever 121 which controls the input gear Z which provides two forward and two reverse range ratios as described above. As will be evident from the earlier description, the provision of the two speed output gear set Y which is controlled by lever 120 doubles the number of ranges provided by the transmission to four forward ranges FA, FB, FC and FD and four reveres ranges RA, RB, RC and RD.

This doubling of the avialable ranges is reflected in the gate for lever 121 in which when the lever 121 is moved forwardly either forward range FA or FC is engaged depending on whether the output gear set Y is in its lower or higher range. In a similar fashion, when lever 121 is moved rearwardly either forward range FB or FD is engaged depending on whether gear set Y is in its lower or higher range.

As indicated by FIG. 13, reverse ranges RA and RC can be engaged by moving lever 121 sideways and rearwardly from the FA/FC position while reverse ranges RB and RD can be engaged by moving lever 121 sideways and forwardly from the FB/FD position (RA and RB are engaged with gear set Y in its lower range and RC and RD are engagerd with gear set Y is in its higher range).

Figure 14:
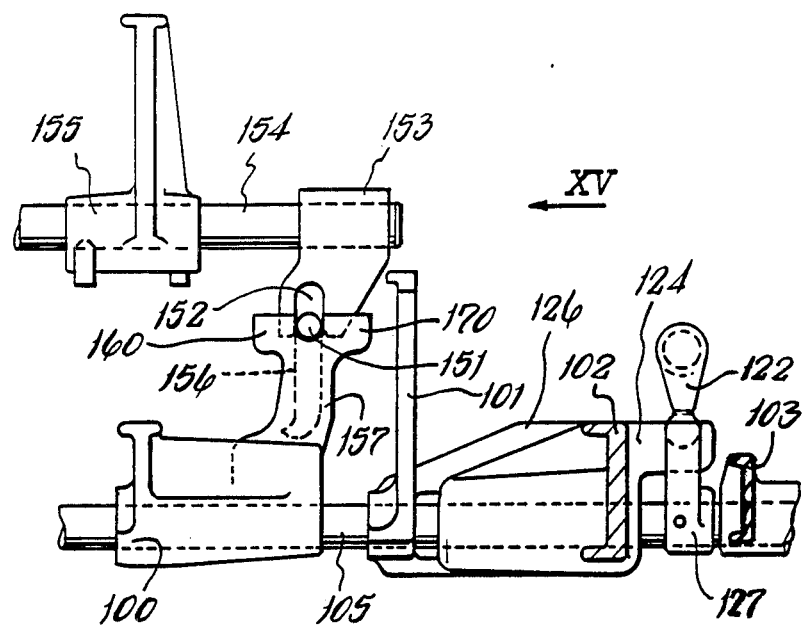
FIGS. 14 and 15 show side and end views respectively of the selector mechanism of input gear Z in the directions of Arrows XIV and XV respectively shown in FIGS. 15, 14 and 3.

As can be seen from FIG. 7, the inner end of selector shaft 113 is provided with an arm 150 and a projection 151. Projection 151 is engaged in a cutout 152 in a selector member 153 (see FIG. 14) which is mounted on a selector rod 154 which carries a selector fork 155 which operates sleeve M. Projection 151 is also engageable in a cutout 156 in a selector member 157 which is bolted to the selector fork 100 which operates sleeve N.

Figure 15:
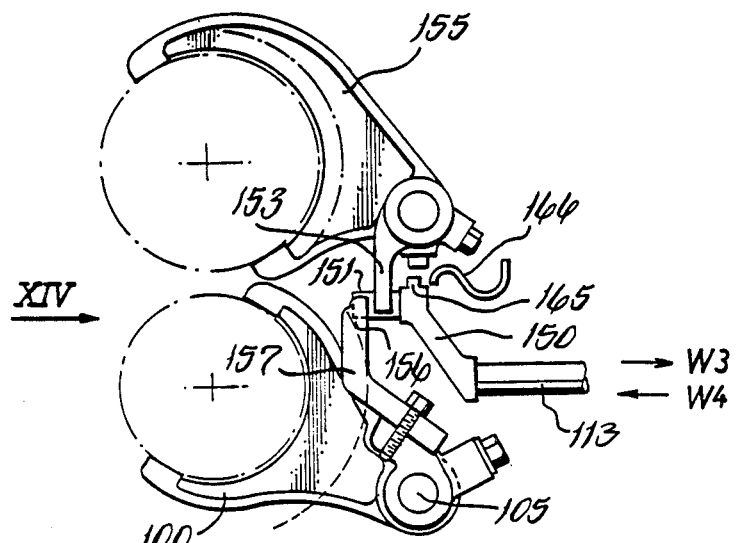
Figure 17:
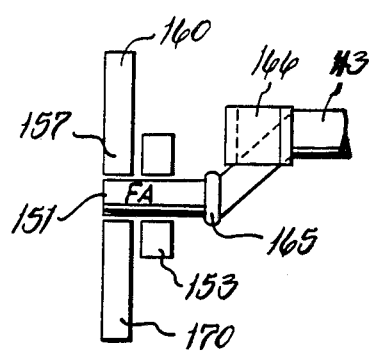

As previously indicated, forward range FA is provided when both sleeves M and N are moved to the right of their central positions as viewed in FIG. 1 and gear set Y is in its lower range. This range is selected when the gear lever 121 occupies the FA/FC position of FIG. 13 in which the projection 151 is in engagement with both cutouts 152 and 156 as shown in FIG. 15 and diagrammatically illustrated in FIG. 17.

Figure 16:
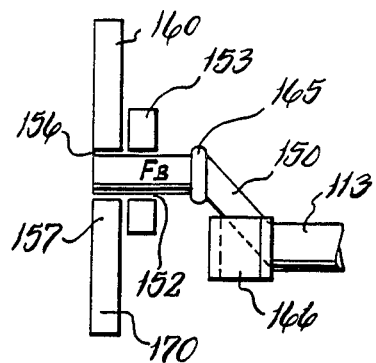
FIGS. 16 to 19 show diagrammatic plan views of the various movements of selector members 153 and 157 and selector shaft 113.
Figure 20:
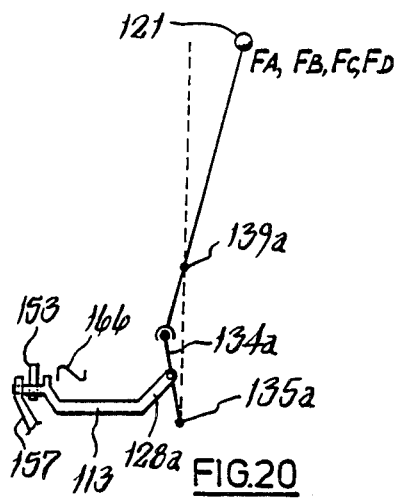
FIGS. 20 to 23 show diagrammatically the various movements of gear lever 121 involved in the selection of all four ratios of input gear Z (FIGS. 20 and 22 correspond to FIG. 7 and FIGS. 21 and 23 are in direction of Arrow XXI of FIG. 7)
Figure 21:
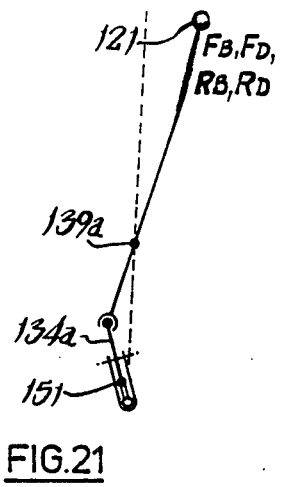
Figure 23:
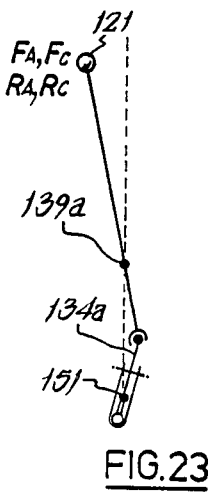

If the operator now wishes to change to the second forward range FB of input gear set Z (in which both sleeves M and N are to the left of their control positions as viewed in FIG. 1 and gear set Y is in its lower range) he moves the gear lever 121 to the FB position of FIG. 13 which maintains the projection 151 in cut outs 152 and 156 and moves the selector members 153 and 157 to the FIG. 16 position by rotation of shaft 113. FIGS. 20, 21 and 23 diagrammatically illustrate the configuration of gear lever 121, lever 134a and shaft 113 when forward range FA, FB, FC and FD are selected. It will be observed that during movement between the FA and FB positions of FIGS. 17 and 16 flange 165 on arm 150 remains to the left of baulking plate 166. Baulking plate 166 prevents axial movement of selector shaft 113 in direction W3 at locations intermediate the FA and FB positions. Preferably the selector mechanism is biased so as to tend to move the gear lever 121 to the forward range change plane FA/FC to FB/FD of FIG. 13. This can be achieved, for example, by a spring 305 which acts between fork member 128a and lever member 134a and tends to bias fork member 128a towards and into contact with the end 306 of extension 130a of FIG. 7 in which position projection 151 engages both cut outs 152 and 156.

Figure 18:
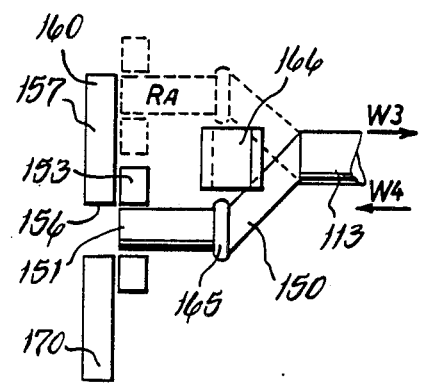
Figure 22:
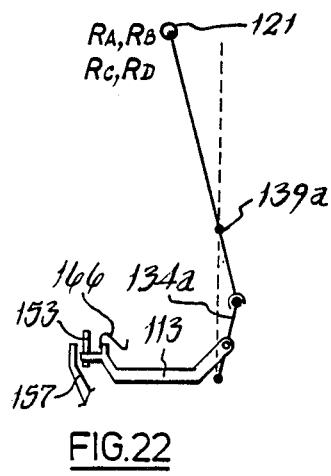

If with the transmission in forward range FA (see FIG. 17) the operator now wishes to select reverse range RA the selector shaft 113 is moved axially in direction W3 (see FIG. 18) to disengage cut out 156 in selector member 157 by sideways pivotting of lever 121 to the FIG. 22 position. The selector shaft is then turned by rearward movement of gear lever 121 to the FIG. 21 position to bring the selector member 153 to the dotted line RA position of FIG. 18 and thus slide sleeve M to the left of its central position to complete the selection of reverse ratio RA. This movement of lever 121 from forward range ratio FA to reverse range ratio RA is shown by dotted line 200 in FIG. 13. When projection 151 is in the RA position of FIG. 18, movement of the projection to the left (direction W4) into the path of movement of selector member 157 is prevented by ear 160 provided on selector member 157. During turning of selector shaft 113 to the RA position of FIG. 18 the flange 165 moves under the baulking plate 166.

Figure 19:
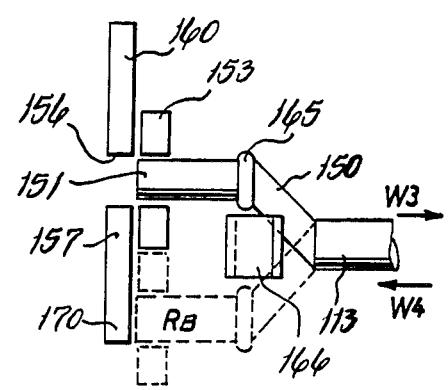

In a similar fashion if the input gear set Z is in forward range FB (see FIG. 16) the reverse range RB (see FIG. 19) is achieved by axially displacing selector shaft 113 in direction W3 to disengage cut-out 156 by sideways pivotting the gear lever 121 to the FIG. 22 position and then turning the selector shaft by forward pivotting of gear lever 121 to the FIG. 23 position. This will bring the selector member 153 to the dotted-line RB position of FIG. 19 and thus moves the sleeve M to the right of its central position to complete the selection of reverse ratio RB. Again when projection 151 is in the RB position of FIG. 19 movement of projection 151 to the left (direction W4) is prevented by ear 170 provided on selector member 157. During turning of shaft 113 to the RB position of FIG. 19 the flange 165 moves under the baulking plate 166. The movement of lever 121 from the forward range FB to reverse range RB is shown by dotted line 201 in FIG. 13.

As will be evident from the above description the interaction between flange 165 and baulking plate 166 and the ears 160 and 170 fully define the operating gate of lever 121 so that there is no additional requirement to physcially guide the lever 121.

Figure 26:
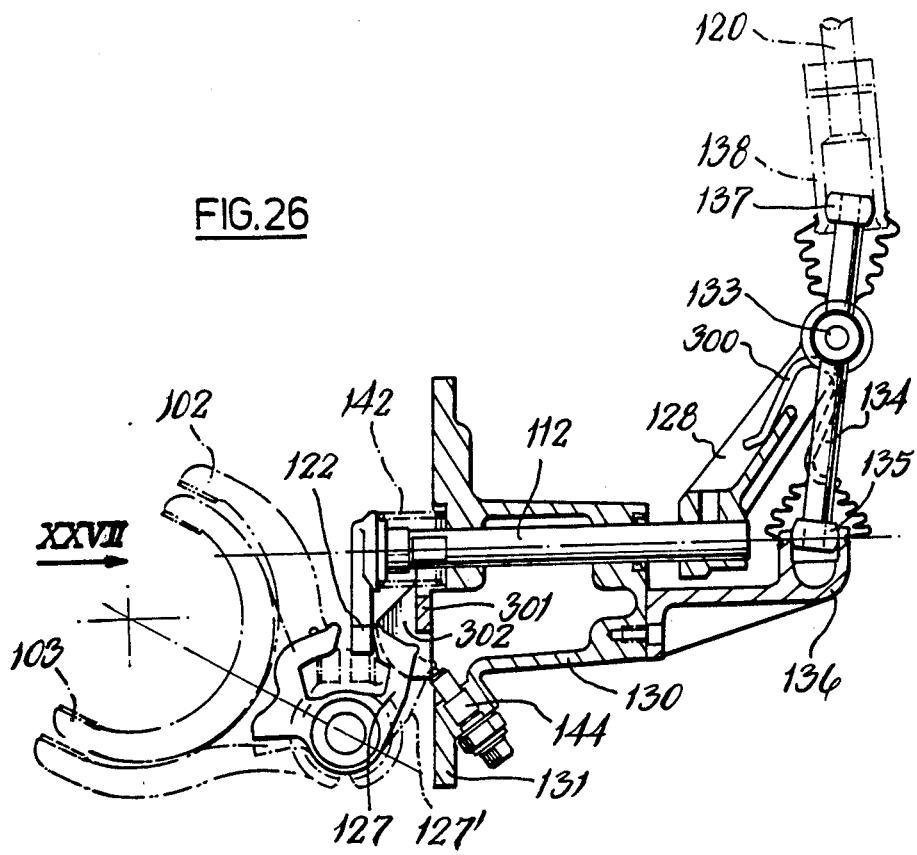
FIG. 26 shows a modified form of gear lever selector mechanism.
Figure 27:
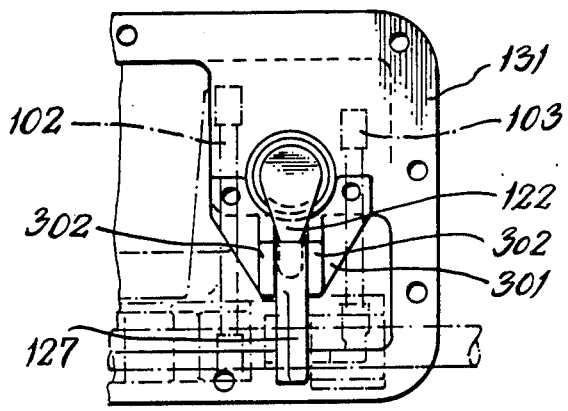
FIG. 27 shows a view in the direction of Arrow XXVII of FIG. 26.

FIGS. 26 and 27 show a modified form of gear lever selector mechanism for use in connection with gear lever 120 in which those components of equivalent function to those described above in relation to FIGS. 5 and 6 are similarly numbered.

In the arrangement shown in FIGS. 26 and 27 the electrical switch 144 has been moved adjacent the path of movement of interlock member 127 and a spring 300 is provided which acts between lever 134 and fork member 128 and in conjunction with spring 142 acts to bias shaft 112 and hence finger 122 to the position shown in FIG. 26 in which gear lever 120 is in the first and second ratio in plane m of FIG. 12. In order to operate switch 144 to change between the higher and lower ranges of gear set Y, the lever 120 is moved whilst in the neutral plane n to the left of plane m to the H/L position of FIG. 12. This draws shaft 112 and finger 122 to the right of the position shown in FIG. 26 against the action of spring 142 and pivots interlock member 127 clockwise to dotted-line position 127' to contact and operate switch 144. As in the previously described arrangement each movement of gear lever 120 to the H/L position of FIG. 12 causes gear set Y to change between is higher and lower ranges.

A guidance plate 301 with protruding flanges 302 is secured to the inside of plate 131. This guidance plate ensures that FIG. 122 can only move to the right of the position shown in FIG. 26 when in the neutral plane n.

One of the main benefits of the present invention is that the removal of the lower selector forks 100, 101, 102, and 103 can be easily effected via the opening 132 by removing set screw 108 and then sliding the selector fork mounting rail 105 to the right as viewed in FIG. 3 whilst removing the forks one by one from the left-hand end of the rail 105.

It will also be appreciated that a particularly economic selector fork arrangement is also provided particularly when the selector fork 104 for the creeper unit C and the hydraulic cylinder 114 for the operation of selector fork 103 are also mounted on the same rail 105.

I claim:

1. A vehicle transmission having a housing a multi-ratio main change speed gear set and a first range change gear set in series within the housing, selector forks for effecting speed and range changes in the transmission, a single selector fork rail on which the selector forks are mounted for axial sliding movement, rail support means and rail fastening means for supporting and fastening the rail in a stationary position within the housing and also supporting the rail for axial sliding within the housing on release of the fastening means, and an access aperture in the housing whereby, after release of the rail fastening means, the selector forks can be removed one by one from one end of the rail via the aperture on sliding of the rail within the housing.

2. A transmission according to claim 1 having a second range change gear set operated by a further selector fork which is also mounted on and movable relative to the same selector fork rail.

3. A transmission according to claim 1 having a creeper gear facility which is operated by a still further selector fork which is also mounted on and movable relative to the same selector fork rail.

4. A transmission according to claim 1 having an hydraulic cylinder which surrounds part of the rail, the cylinder being connected with one of the range change selector forks for axial sliding of said fork relative to the rail.

5. A transmission according to claim 4 in which the hydraulic cylinder is double-acting and contains a differential area double-acting piston which surround the rail and divides the cylinder into two operating chambers, the arrangement being such that if both operating chambers are subjected to the same level of pressure the piston moves in a first direction and if only one chamber is pressurised the piston moves in the opposite direction.

6. A transmission according to claim 1 having an interlock member which ensures the movement of only one of the selector forks of the main change speed gear set at a given time, the interlock member being pivotally mounted on the same selector fork rail.

7. A transmission according to claim 1 in which a pair of the selector forks are moved relative to the selector fork rail by a selector mechanism comprising an upper manually operable gear lever which is mounted intermediate its ends for pivoting about two perpendicular axes, a lower lever member which is pivoted in a fixed mount at its lower end and is operatively connected at its upper end with the lower end of the gear lever, the lower lever being interconnected intermediate its ends with a ratio selector shaft whose longitudinal axis passes through the fixed mount, the arrangement being such that pivotting of the gear lever about one of the perpedicular axes causes axial displacement of the selector shaft in a direction parallel to its longitudinal axis to engage one or both of said pair of selector forks and pivotting of the gear lever about the other perpendicular axis causes turning of the selector shaft about its longitudinal axis to move the engaged selector fork or forks relative to the selector fork rail.

* * * * *